United States Patent
Kernke et al.

(10) Patent No.: US 8,560,576 B2
(45) Date of Patent: Oct. 15, 2013

(54) MASS CHANGE OF MASTER DATA VIA TEMPLATES

(75) Inventors: Christoph Kernke, Bensheim-Auerbach (DE); Oswald Wieser, Schwetzingen (DE)

(73) Assignee: SAP AG, Walldorf (DE)

( * ) Notice: Subject to any disclaimer, the term of this patent is extended or adjusted under 35 U.S.C. 154(b) by 407 days.

(21) Appl. No.: 11/965,646

(22) Filed: Dec. 27, 2007

(65) Prior Publication Data
US 2009/0172020 A1      Jul. 2, 2009

(51) Int. Cl.
*G06F 17/30*      (2006.01)

(52) U.S. Cl.
USPC .......................................... 707/803; 717/106

(58) Field of Classification Search
USPC ............................ 707/779, 944, 803; 717/106
See application file for complete search history.

(56) References Cited

U.S. PATENT DOCUMENTS

| | | | | |
|---|---|---|---|---|
| 5,999,724 A * | 12/1999 | Iwasa et al. | ...................... | 703/22 |
| 7,149,742 B1 * | 12/2006 | Eastham et al. | .............. | 707/101 |
| 7,343,551 B1 * | 3/2008 | Bourdev | ........................ | 715/209 |
| 2001/0050681 A1 * | 12/2001 | Keys et al. | ..................... | 345/418 |
| 2002/0073125 A1 * | 6/2002 | Bier | ............................... | 707/530 |
| 2002/0184043 A1 * | 12/2002 | Lavorgna et al. | ................. | 705/1 |
| 2005/0278645 A1 * | 12/2005 | Maur et al. | ..................... | 715/762 |
| 2006/0026151 A1 * | 2/2006 | Greene et al. | ..................... | 707/4 |
| 2007/0239679 A1 * | 10/2007 | Wieser et al. | ..................... | 707/3 |
| 2008/0091780 A1 * | 4/2008 | Balan et al. | ................... | 709/204 |
| 2008/0183500 A1 * | 7/2008 | Banigan | ........................... | 705/3 |

* cited by examiner

*Primary Examiner* — James Trujillo
*Assistant Examiner* — Dawaune Conyers
(74) *Attorney, Agent, or Firm* — Mintz Levin Cohn Ferris Glovsky and Popeo, P.C.

(57) ABSTRACT

A data entry template can be associated with each of a plurality of data records that are distributed across a plurality of heterogeneous or homogeneous data sources which can optionally be data bases. The data entry template can be modified to reflect a change to a business process that was previously represented by the template. The change to the business process can be propagated to at least part of the plurality of data records associated with the template. Related systems, apparatus, methods, and/or articles are also described.

22 Claims, 10 Drawing Sheets

Material Template: Sales Radiators Standard  Personalize  Help

Template Status: In Preparation    Template ID TP001004    Business Area Sales

[Save] [Cancel] [New▼]

| General | Process Data | Related Materials |

[Disconnect from template]

| Material ID | Material Description | Template Assigned By | Template Assigned On |
|---|---|---|---|
| MCF-0036 | AHT Radiator wall 5 tubes 20" - cream white | Peter Greene | 10/15/06 |
| CPCH502 | Homestead Heating Radiator, wall 5 tubes 20" - cream white | Jenny Bloomfield | 09/17/06 |
| CPRD909 | Sandfort Radiator, wall 5 tubes 20" - cream white | Teri Jackson | 04/28/06 |
| MCF-0003 | AHT Combi 190 | Peter Greene | 10/15/06 |
| MCF-0001 | AHT Combi 75 | Peter Greene | 10/15/06 |
| MCF-0004 | AHT Combi Max | Otis Miller | 09/28/06 |

MASS CHANGE OF MASTER DATA VIA TEMPLATES

FIELD

The subject matter described herein relates to making mass changes to master data using templates.

BACKGROUND

Data entry operations in an application, such as for example a database, an enterprise resource program, etc., can be quite time consuming. A software application might include one or more data entry user interfaces (UI) that allow a user to create a new record containing one or more details about a person, product, service, location, or the like. In some instances, some or all of the data entered might be the same as data entered previously for other records. For example, a UI in an application that creates a record of an employee might have details such as name of the employee, employee identification number, name of a team the employee works in, and name of a manager of the team. When records for a number of employees working in the team are created, each record can be created one by one. A part of the data such as name of the team and name of the manager can in some examples be same for all employees working in the team. Though the name of the team and the name of the manager might be same they may have to be entered for all the employees working in the team. This can be inefficient as the data may be entered for all the employees manually even though they are same. Thus, entering the same data repetitively may result in an unproductive usage of time and effort.

In addition to potential inefficiencies that may occur in data entry with a number of repeated entry values, making updates or changes to previously entered master data can be quite cumbersome and inefficient as well. Mass changes to master data can in some examples become necessary if the user company or enterprise makes changes to internal processes, such as for example supply chain handling or the like. Such changes can in some instances require changes to master data records that underlie the record keeping, execution, and maintenance of such processes.

SUMMARY

In one aspect, a data entry template is associated with each of a plurality of data records that are distributed across a plurality of data sources. These data sources can be homogeneous, heterogeneous, or heterogenous with homogeneous sections. The data entry template is modified to reflect a change to a business process that was previously represented by the template. The change to the business process is propagated to at least part of the plurality of data records associated with the template.

In some variations one or more of the following can optionally be included. The data entry template can optionally be associated with each of the plurality of data records when each of the plurality of data records are created. The associating can optionally include storing a parameter that indicates the identity of the template in each of the plurality of data records. The data entry template can optionally include a plurality of data fields that are displayed to a user in a user interface. A first of the plurality of data fields can optionally access a value pattern that is based on an entered value entered in a second of the plurality of data fields and that provides a proposed value for the first field. A user can optionally be prompted to update the template if the user enters a value in the first field that does not match the proposed value for the first field. A user can optionally be prompted to create a new template if the user enters a value in the first field that does not match the proposed value for the first field. In other optional variations, the template can be modified via a user interface provided to a user. Via the template, the used can optionally alter one or more values of one or more data entry fields in the template. Alternatively or in addition, the modifying can optionally include recognizing that a user has accessed a record of the plurality of data records and made a change to one or more values in the record, and prompting the user to update the template to reflect the change to the one or more values.

The proposed value for the first field can optionally be auto-filled into the first field. The template can optionally be prepared by designating a test record from among the plurality of data records, comparing every other one of the plurality of test records to the test record, generating a similarity pattern based on the comparison if similarities between the test record and another of the plurality of data records exceeds at least one of the one or more pattern significance guidelines, and repeating the designating, comparing, and generating until each of the plurality of records has been designated as the test record once.

The associating of the data entry template with each of the plurality of records can optionally include receiving a first value for a first attribute of one of the plurality of data records in a user interface, accessing a value pattern included in the data entry template for a second attribute based on the first value, proposing a second value for the second attribute from the value pattern, and storing a parameter indicating the identity of the template in the one of the plurality of data records. The propagating can optionally occur without downloading the plurality of data records from the data sources. The change to the business process can optionally be propagated to all of the plurality of data records associated with the template.

In an interrelated aspect, a system includes a memory that stores instructions in a machine readable language and a processor that accesses the memory and executes the instructions to implement a template updater. The template updater performs actions including receiving a command states a modification to a template associated with a plurality of data records that are distributed across a plurality of heterogeneous data sources from a user at a user interface. The modification reflects a change to a business process that was previously represented by the template. The template updater modifies the data entry template in accordance with the command, and accesses one or more of the plurality of heterogeneous data sources to propagate the change to the business process to at least part of the plurality of data records associated with the template. In optional variations the template updater can prompt a user to update the template or to create a new template if the user enters a value in a first field of the template that does not match the proposed value for the first field.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings.

DETAILED DESCRIPTION

The current subject matter can provide, among other possible advantages, methods, techniques, systems, apparatuses, and the like for making mass changes to master data. Higher master data quality standards can be achieved, because master data mass changes can be propagated into master data instances without requiring removal of the master data from open online access by all users to effect the necessary changes. Rather, changes can be made very quickly and efficiently for a large number of records because propagated template changes can become effective immediately with the change of the template. Errors that might be introduced by offline data updating processes can be minimized, such as for example incorrect field formatting, incorrect field conditions, losing offline changes, inadvertent overwriting of master data changes that may be initiated by a third party during the offline process, etc.

The capabilities to efficiently make mass changes to existing data can be quite important to many enterprises since the number of master data entries used in business transactions can often reach or even exceed tens of thousands of records. Some larger companies may even keep million of master data records consistently up-to-date. In general, almost any user of an enterprise resource program, inventory control program, or any other kind of database management software program will from time to time have the need to conduct mass changes to master data in databases or other data sources. In some examples, these updates may happen every 3, 6, 9 or 12 months or on other periods or even at non-fixed intervals.

One possible approach to mass updating of master data is to download the master data to a format that can be manipulated on a client machine, for example a format readable by Microsoft Excel or other spreadsheet programs, make the necessary changes in the downloaded data using the spreadsheet program or other offline tool, and then re-upload the data to the database or other data source such as an application program. This approach can be inconvenient and also inherently risky as formatting errors can be introduced by the download and upload processes. Additionally, a downloaded set of records generally represents only a snapshot of the data. Once the master data records are downloaded the original records in the online system are susceptible to changes due to access by other users. Upon re-uploading the changed data, any revisions to the online data made during the download and change process might be overwritten and therefore lost.

Data input can be streamlined using templates as described previously in co-pending and co-owned U.S. patent application Ser. Nos. 11/393,739, filed Mar. 31, 2006 and entitled "Master Data Generation and Utilization," and 11/733,785, filed Apr. 11, 2007 and entitled "A Technique for Auto Filling Values in a User Interface, the complete disclosures of which are incorporated herein by reference. In some variations, one or more value patterns can be created for an attribute in a user interface (UI) which proposes a value that may be filled for the attribute in the UI. "Default" values can be suggested for fields in a user-fillable template based on the value pattern or patterns as follows. A first value of a first attribute in the UI can be received and a value pattern for a second attribute in the UI created dynamically based on the first value. A second value for the second attribute can be automatically proposed from the created value pattern. The second value can be automatically filled with a proposed value from the value pattern whose frequency of occurrence can exceed a threshold frequency of the second attribute. The proposed value from the created value pattern can be automatically entered in the second attribute, provided in a list of one or more proposed values, or the like. A user can be given the option to overwrite or ignore the proposed value. During entry of data records using templates such as these, data records can retain an indicator, label, flag, or other "memory" of the template used to create the data record. The current subject matter can make use of these patterns, which can include data maintenance and/or entry templates, that can be pre-defined sets of data, to standardize and automate master data maintenance. In general, master data that were entered or maintained using a template can maintain a record or a link to the template used for data entry or maintenance. Templates can also be manually assigned by users. Alternatively one or more homogenous parts of a template can be calculated within a heterogeneous database or data source by a particular formula and weighting matrix, such as for example as described in greater detail below.

During the useful life-time of master data records, the processes of an enterprise might change one or more times. These changes can in some instances require associated changes to its master data records that underlie a process or that other wise provide characteristic or identifying data that might be used or accessed as part of a process. These kinds of process changes can affect not only a single instance but hundreds or thousand master data instances of the same kind or category. In general, it can be observed that master data records that are of the same kind or category can be maintained and/or entered with the help of the same template or templates. Many master data records, for example dozens, hundreds, thousands, tens or hundreds of thousands, or even millions or more, can be maintained by a single template depending on the size of the enterprise and its associated data source or sources, such as for example one or more databases retaining its records.

If a business process, such as for example specifications of a given part, address of a supplier of services or materials, locations of a group or groups of employees, reassignment of a team or group of employees to a different building or business group, promotion of managers to other groups, or the like are changed, templates associated with the entry of data records associated with these processes can be automatically changed as well to reflect process changes that would ordinarily be propagated only in newly created master data records. In one implementation, already existing master data records can retain an identifier, a link, or some other "memory" of the template by which data entry and maintenance are performed. Changes or updates to the template that are necessitated by business process changes can then be propagated into the already existing master data records.

Whether a change of a template is propagated into its associated master data records can be a user-selectable option that can in some variations be set during the updating of the template. For example, a user can be prompted during entry of a data record using a template to modify an existing template or alternatively to create a new template. Such a prompt could be given if the user overwrites a proposed attribute value during entry of a data record. A template updater could note the new data and inquire as to whether the user was intending to create an exception data record or instead was changing the data values that are associated with all other records previously entered or yet to be entered using the template. Creation of a new template would create a new set of data records associated with the new template and not with the old template. Modification of the existing template would initiate a process by which data records associated with the modified template can be accessed and updated to reflect the newly updated data entries. In some variations, this decision can be based upon a single master data instance.

Figure 1:
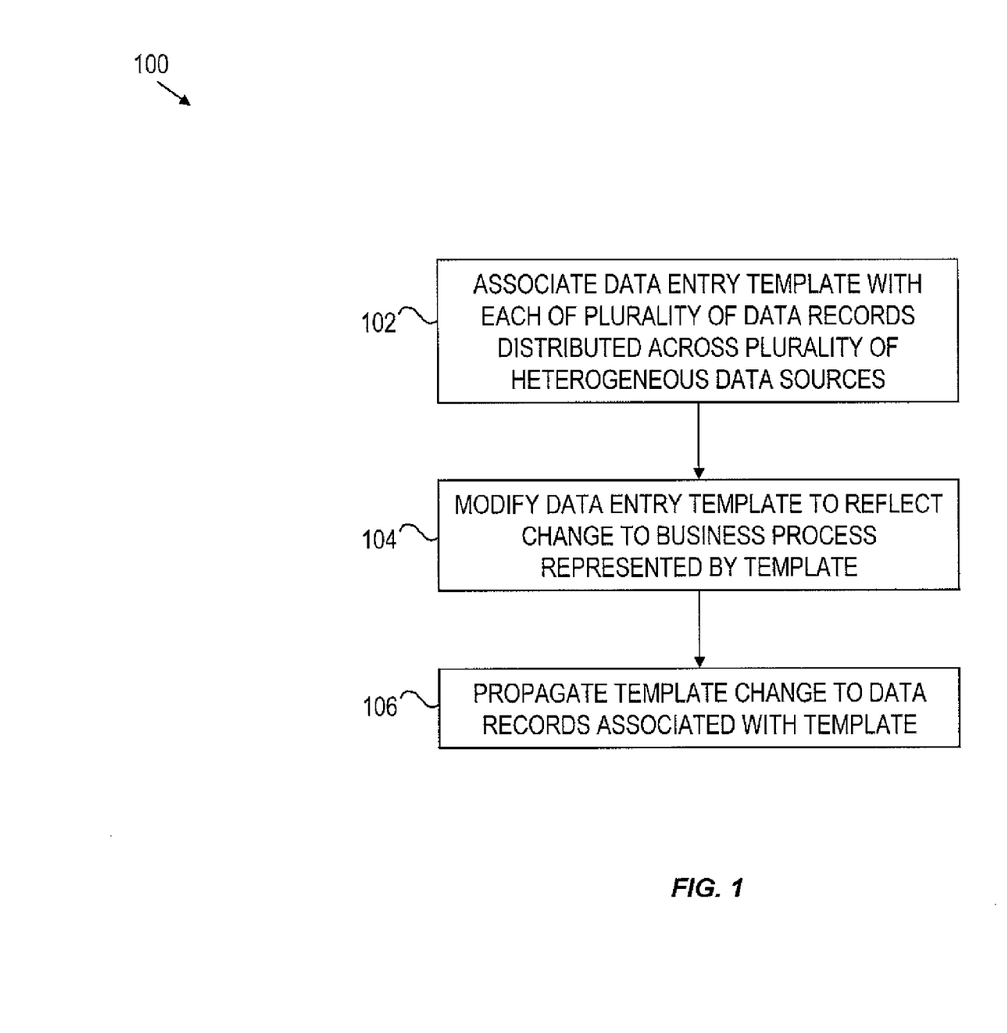
FIG. 1 is a process flow diagram illustrating a method for updating master data using templates.

In one implementation shown in the process flow diagram 100 of FIG. 1, a data entry template can be associated with each of a plurality of data records that can be distributed across a plurality of data sources at 102. The data records can include records related to business processes, characteristics or identifications pertaining to data about one or more processes or materials, or the like. The data sources can be heterogeneous or homogeneous databases, different modules of an enterprise resource management program; spreadsheets, data applications, Web servers, and the like. Data sources can also be homogeneous portions of heterogeneous databases. The data entry template can be similar to those described above. In general, any template that can provide prompts to a user for proposed data for one or more data record attributes based on values entered in other data attributes can be used with the current subject matter. At 104, the data entry template can be modified to reflect a change to a business process represented by the template such as has been described above. In one example, an employee group housed in one building can move to another building. When a user enters a new data record related to a new employee associated with the employee group, the user might overwrite the suggested value for the employee location attribute with the new location of the group. The user can then be prompted to inquire whether a new template should be created or the old template updated to reflect a new location associated with employees in the employee group. The user can select to update the template and thereby modify all data records that were created with that template. Alternatively, changes to templates related records can be driven from within a template user interface via which a user accesses, for example a template updater interface and makes changes to one or more values associated with one or more fields provided in the template. The user can be given a choice to make such changes to a template retroactive, wherein they would be propagated back to all records that are associated with the modified templated, which occurs at 106 of FIG. 1, to make the changes applicable only to a limited set of records via some type of manual update process, or only to new records to be created going forward, in which case a new template could be created to be associated with these new records.

Figure 2:
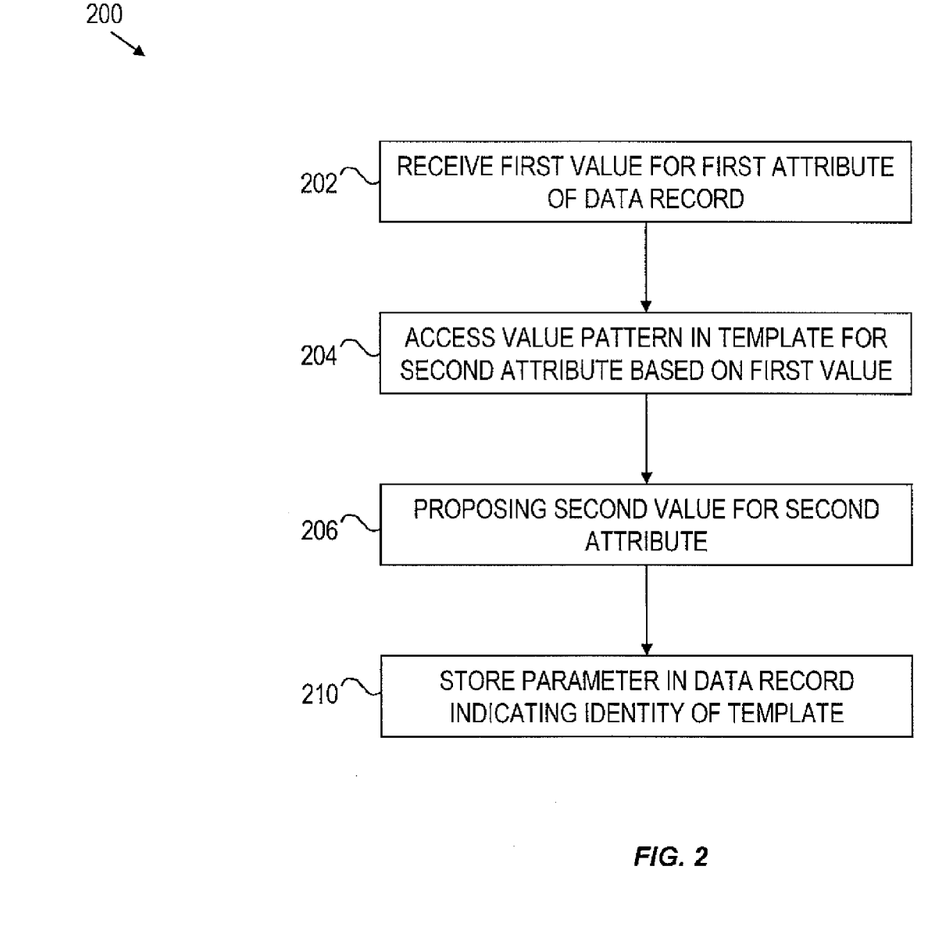
FIG. 2 is a process flow diagram illustrating additional optional steps of a method for updating master data using templates.

FIG. 2 is a second process flow diagram 200 that shows how a template could operate for entry of data. At 202, a first value is received or entered for a first attribute of a data record. In the example discussed in the preceding paragraph, the user could enter an employee group identifier as the first identifier. At 204, the template can access a value pattern that can be created as described above or in the previously filed patent applications that are incorporated by reference. The template returns one or more proposed second values for the second attribute based on the value pattern and the value entered for the first attribute at 206. For the illustrative example, the value pattern might return a building address associated with the employee group identified by the employee group identifier entered as the first attribute. If the user changes this value for the second attribute (and thereby overwrites the proposed value based on the value pattern), the user can be prompted to create a new template based on the new value, to modify the existing template to create a template-driven change to all master data records associated with the template, to make a custom change only to the data record being entered (and thereby disassociate the current data record from the template so that future template-driven mass changes do not impact this record), or some other action. At 210, the data record can store a parameter indicating the identity of the template associated with the data record. As noted above, in other variations, one or more values associated with a template can be updated by other means, such as for example a template updater or other template user interface.

Figure 3:
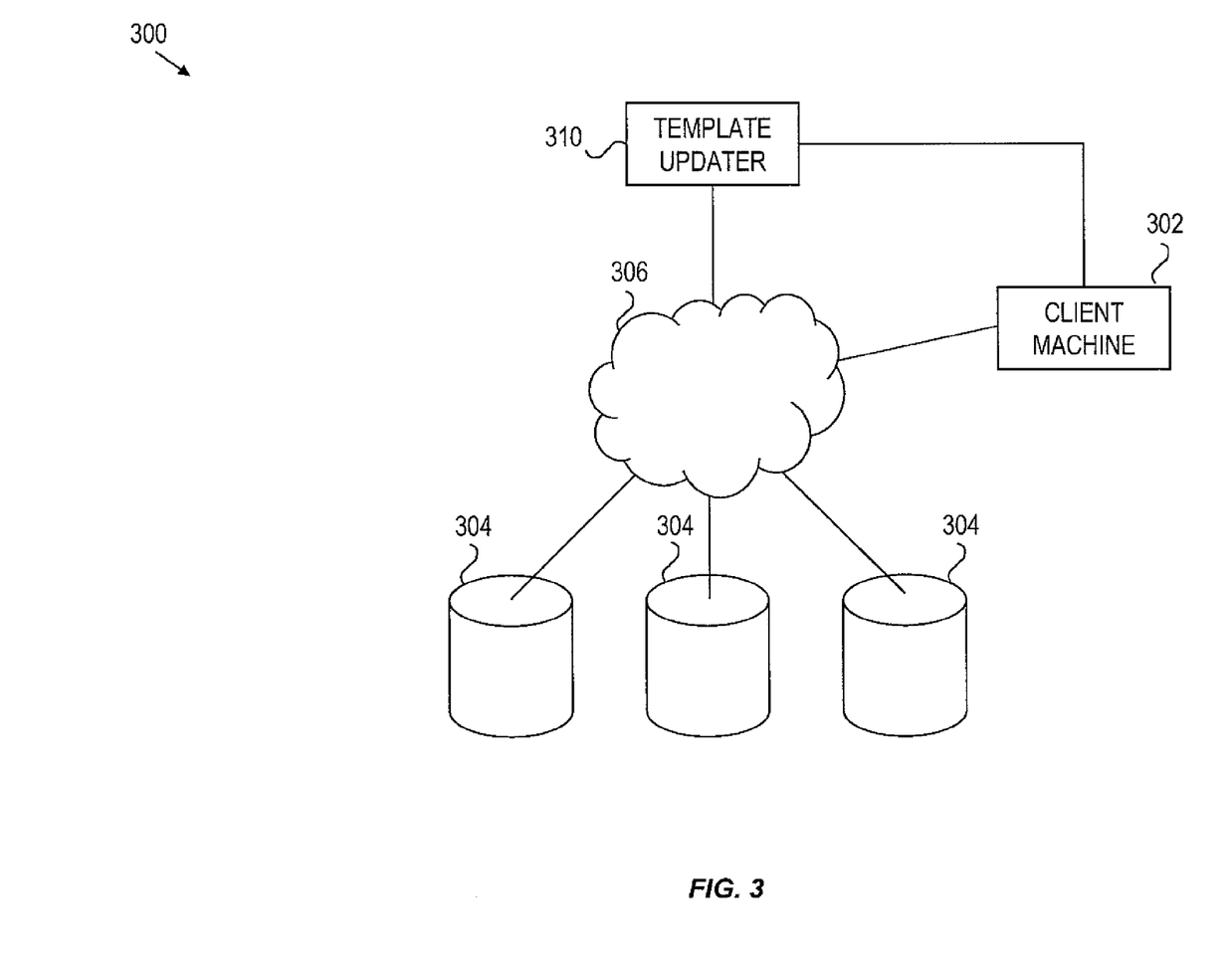
FIG. 3 is a block diagram illustrating a system for updating master data using templates.

In an exemplary implementation shown in FIG. 3, a client computer 302 can access one or more data sources such as for example databases or other service providers 304 over a network 306, which can be an intranet, a local or wide area network, the internet, the World Wide Web, or the like. A template updater 310, which can be implemented on a separate machine, or alternatively on the client machine 302 or on the same machine as one of the one or more data sources 304 can be connected to the client machine such that a user can interact with the template updater via a direct connection or alternatively over the network 306. The template updater 310 can receive a command from a user at a user interface on the client machine 302, on the template updater 310 machine, or at some other computer connected either directly or via the network 306 to the template updater 310. The command can state a modification to a template associated with a plurality of data records that are distributed one or more of the databases 304, which can be a plurality of data sources as described above. The command can be generated in response to a user action, for example in response to a prompt to modify a template to reflect a new value entered for an attribute in the template where the new value does not match a proposed value suggested by a value pattern. The modification can in some variations reflect a change to a business process or data characteristic or identifier that was previously represented by the template. The template updater can modify the data entry template in accordance with the command and access the one or more databases or data sources 304 to propagate the change to the business process or other factor that impacts or necessitates a master data change to at least part of the plurality of data records associated with the template.

Figure 4:
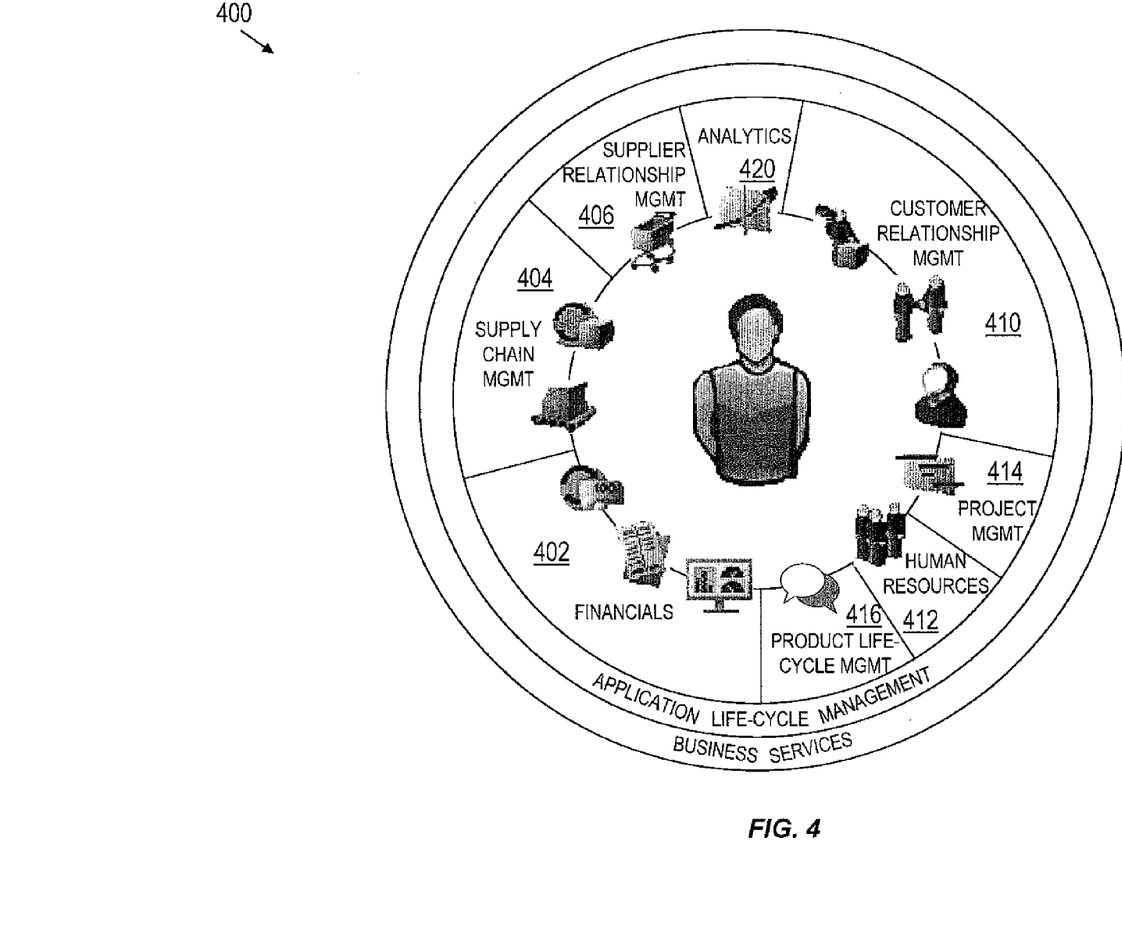
FIG. 4 is a relationship diagram illustrating how master data updates can be used in an enterprise with multiple related databases.

FIG. 4 is a diagram 400 showing an example of how the current subject matter could be implemented into an enterprise to streamline maintenance of master data for materials and/or services tracking. At 402 support can be provided for financial tracking by enabling financial processes per company by valuation classes and prices. Supply chain management can be enhanced at 404 by providing planning and availability confirmation information for various planning processes. At 406, supplier relationship management processes can be enabled by updating templates with information including but not limited to the types and quantities of materials and/or services that need to be purchased, and the suppliers from which they will be ordered. Customer relationship management can also be improved at 410, for example by updating templates with information that can include but is not limited to types of materials and/or services that can be sold, where they can be sold, and what the sales processes are for each material and/or service. Customer part number information can be stored and updated if for example the customer changes part numbers or types. Customer service data can be stored and updated as needed via template changes. Sales prices and associated taxes or other fees can also be mass updated using a template. Data sources, such as for example databases or application programs associated with these areas, as well as those for human resources 412, project management 414, project life-cycle management 416, and enterprise analytics 420 can all be accessed and used to provide data updates for templates used in any other area as well as for determining staffing needs that can be filled either from within the enterprise or via external resources. In this manner, data available at all stages and aspects of enterprise management can be integrated and used to rapidly and intelligently update master data across the enterprise.

Figure 5:
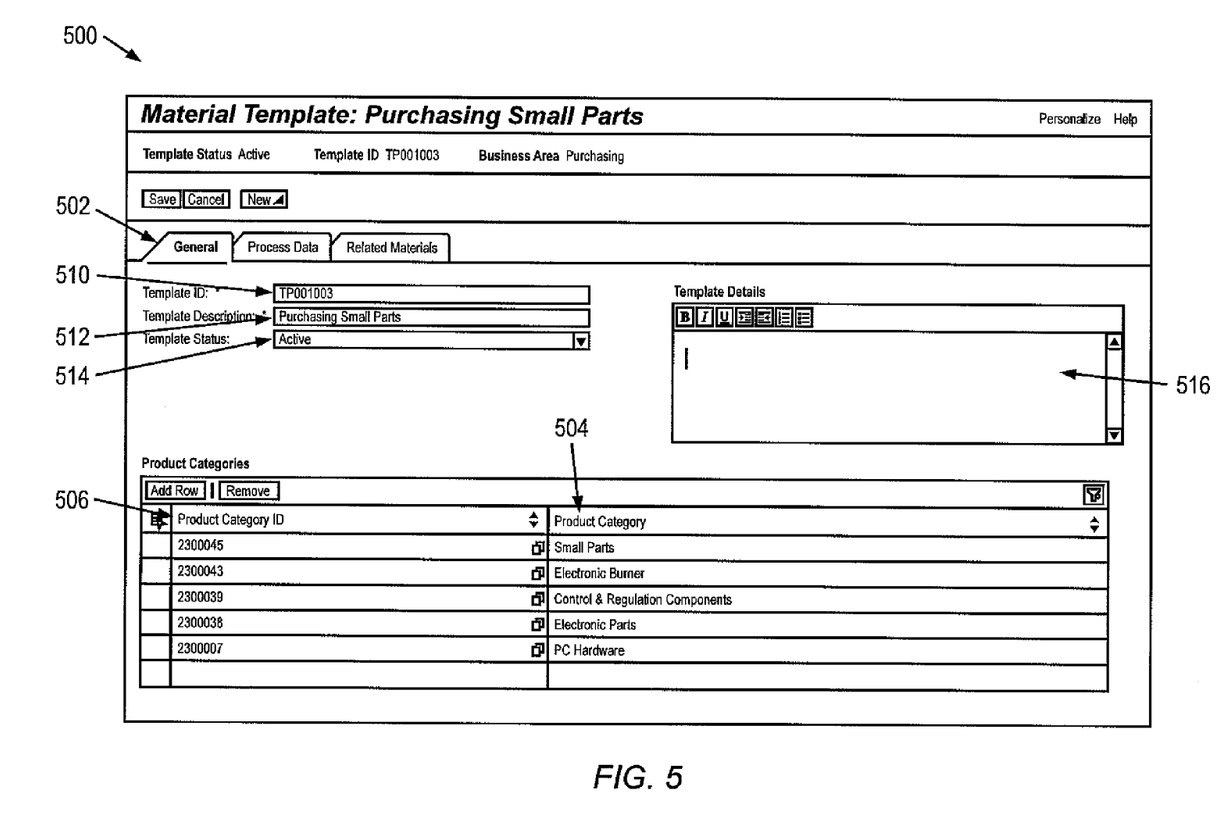
FIG. 5 is a screenshot of a user interface that can be used in conjunction with the current subject matter.
Figure 6:
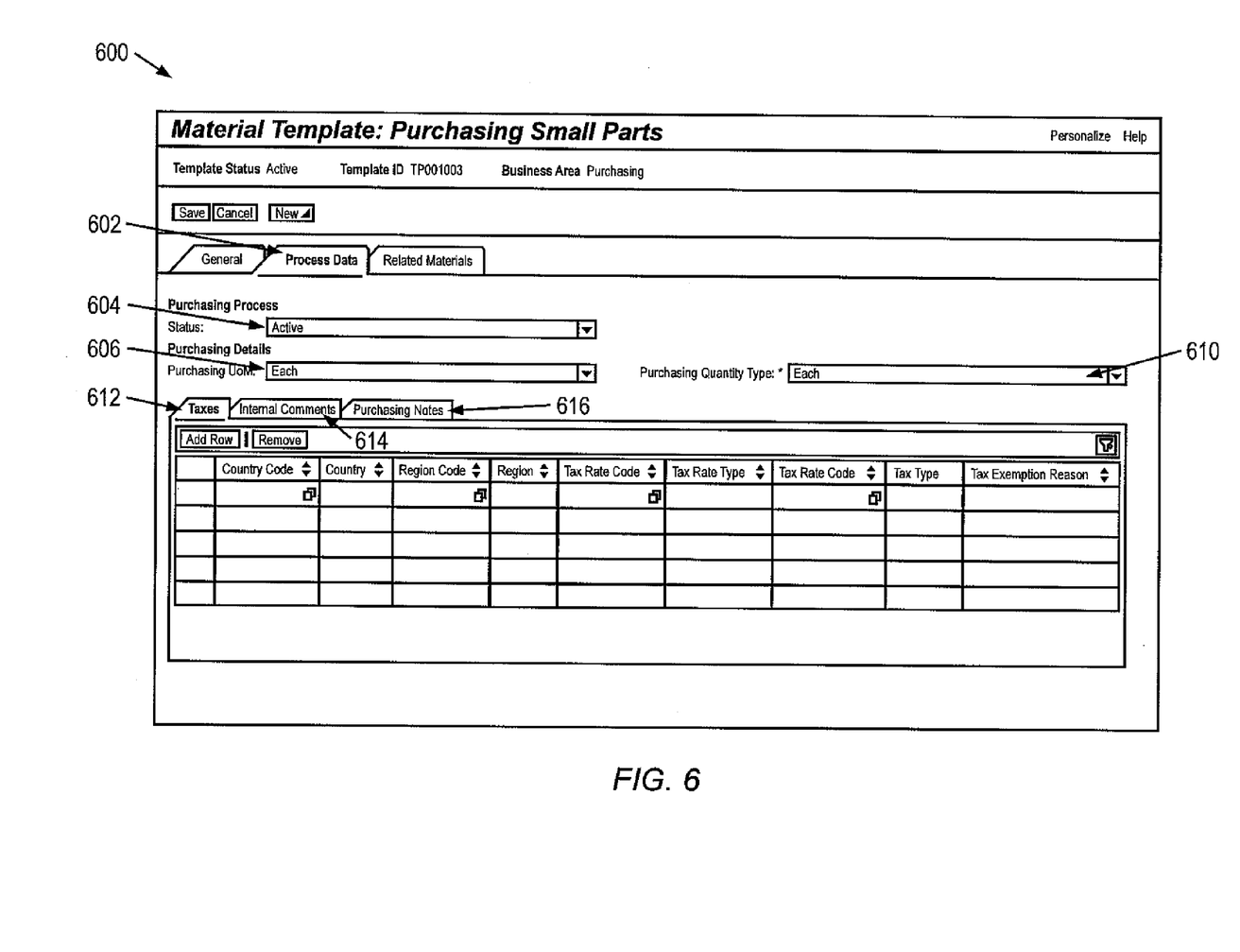
FIG. 6 is a second screenshot of a user interface that can be used in conjunction with the current subject matter.
Figure 7:
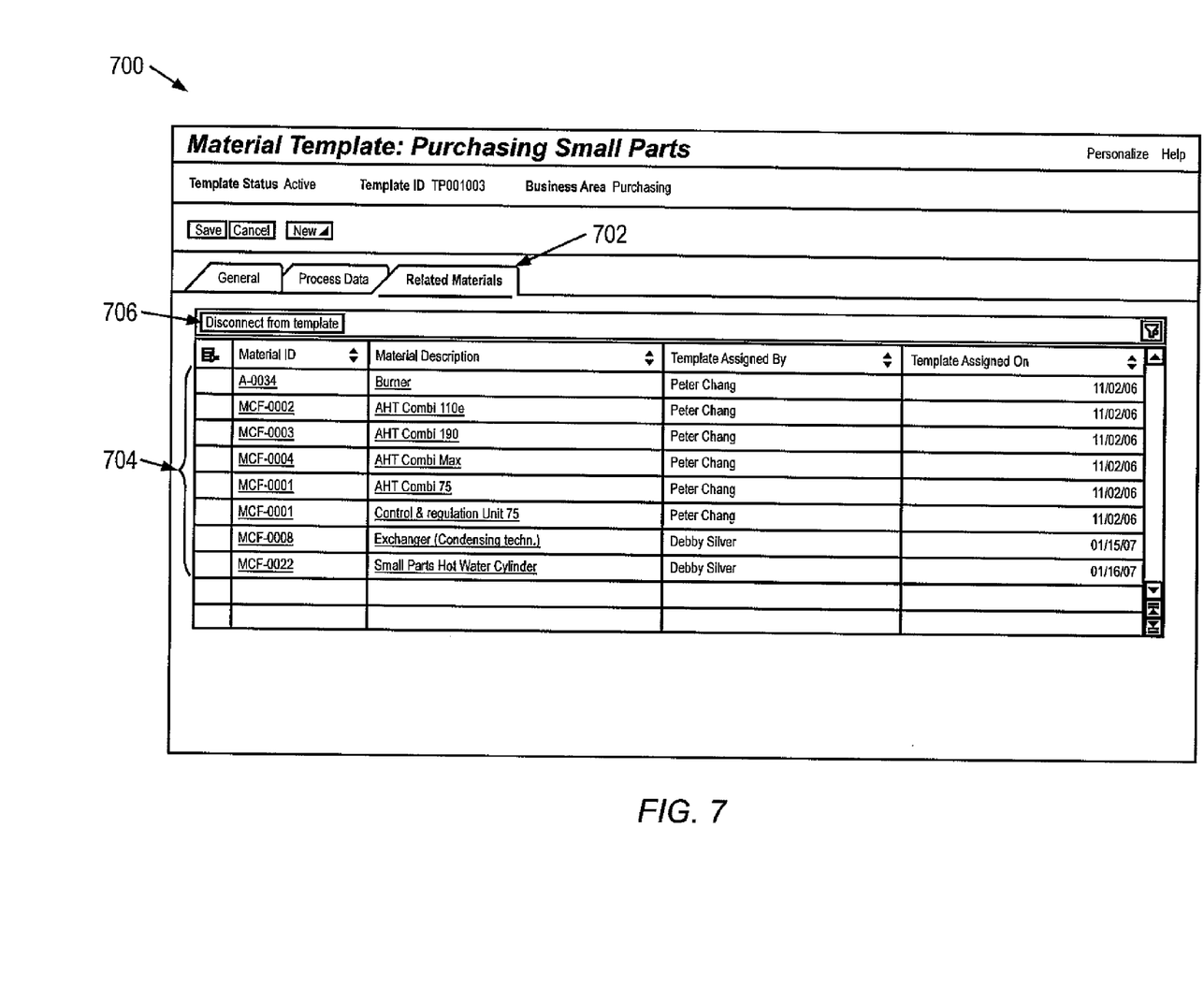
FIG. 7 is a third screenshot of a user interface that can be used in conjunction with the current subject matter.

FIG. 5 through FIG. 7 show user interface screenshots according to a first illustrative implementation of the current subject matter. The first screenshot 500 in FIG. 5 shows a template screen that can be used for entering data related to, for example, purchasing of small parts. The "General" tab 502 allows entry of product categories 504 and their corresponding product category identification codes 506 that are modifiable using this template. Descriptive information about the template, such as a "Template ID" 510, "Template Description" 512, and "Template Status" 514 can also be in fields set on this tab. Other details regarding the template can be entered in a "Template Details" field 516.

The "Process Data" tab 602, which is shown in the screenshot 600 of FIG. 6 enables entry of additional detail related to the purchasing process. The template status is again shown in an adjustable field 604 with a pull-down menu. Additionally, a user can set the Purchasing Unit of Measurement ("UoM") 606 and the Purchasing Quantity Type" 610. Additional information, such as for example taxes 612, comments 614, and notes 616 can be displayed using tab views at the bottom of the screen. These data can be populated from other data sources if available, or entered by a user. FIG. 7 shows a screenshot 700 of the UI with the "Related Materials" tab 702 selected. This tab includes a listing 704 of materials whose master data have been entered using this template. A control 706 is provided that allows one or more selected materials to be disconnected from the template such that future updates to the template are not propagated back to the disconnected records.

Figure 8:
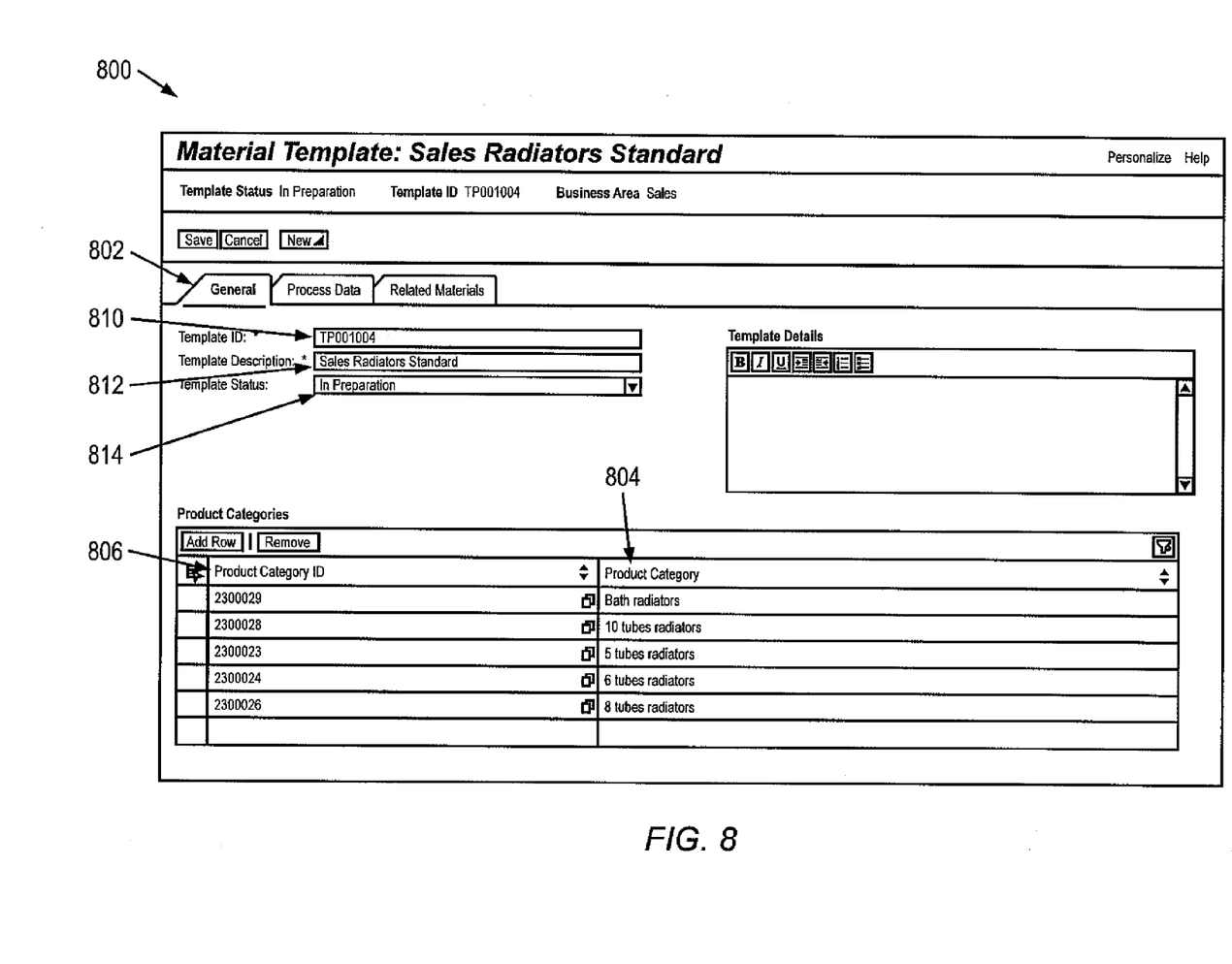
FIG. 8 is a fourth screenshot of a user interface that can be used in conjunction with the current subject matter.
Figure 9:
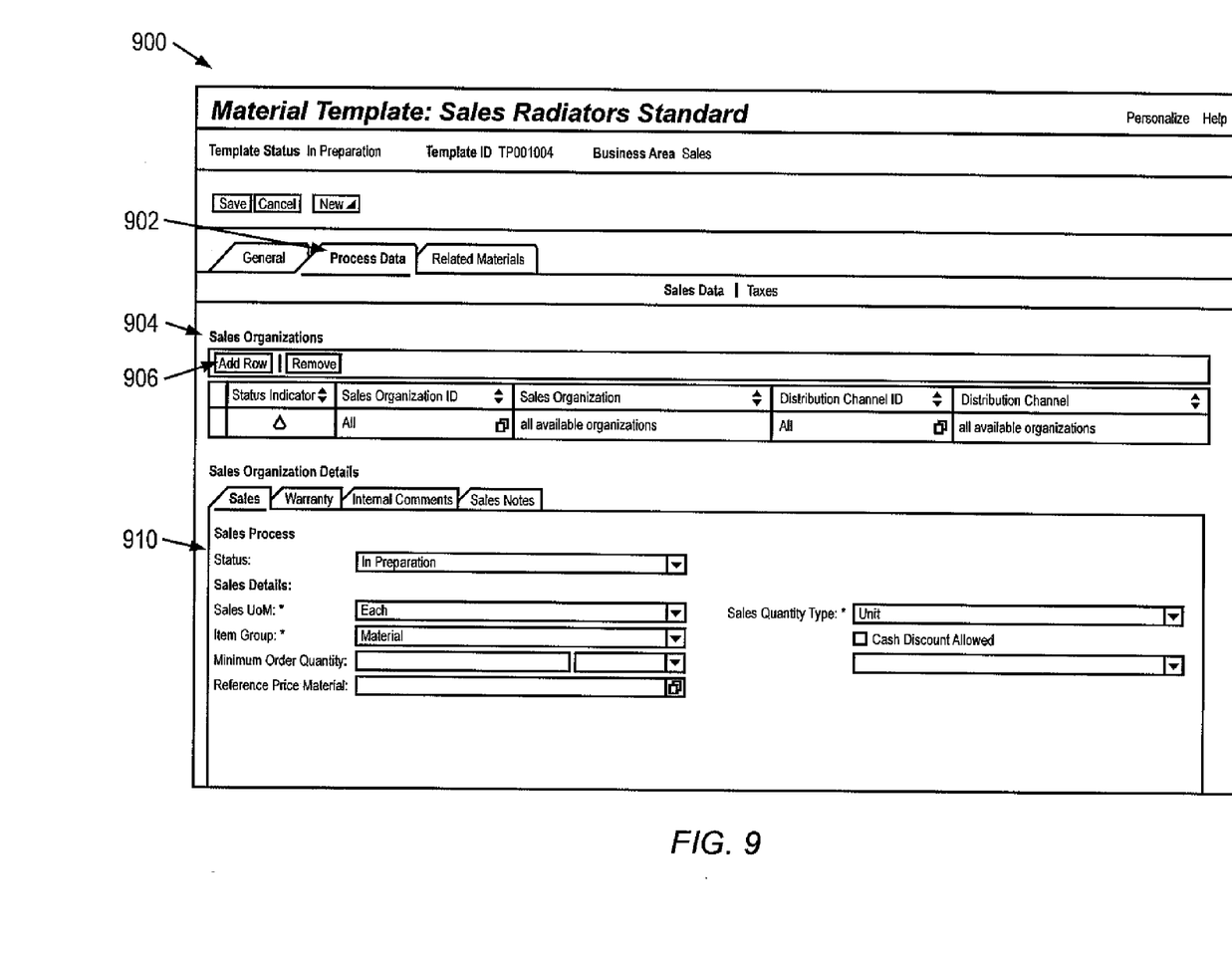
FIG. 9 is a fifth screenshot of a user interface that can be used in conjunction with the current subject matter.
Figure 10:
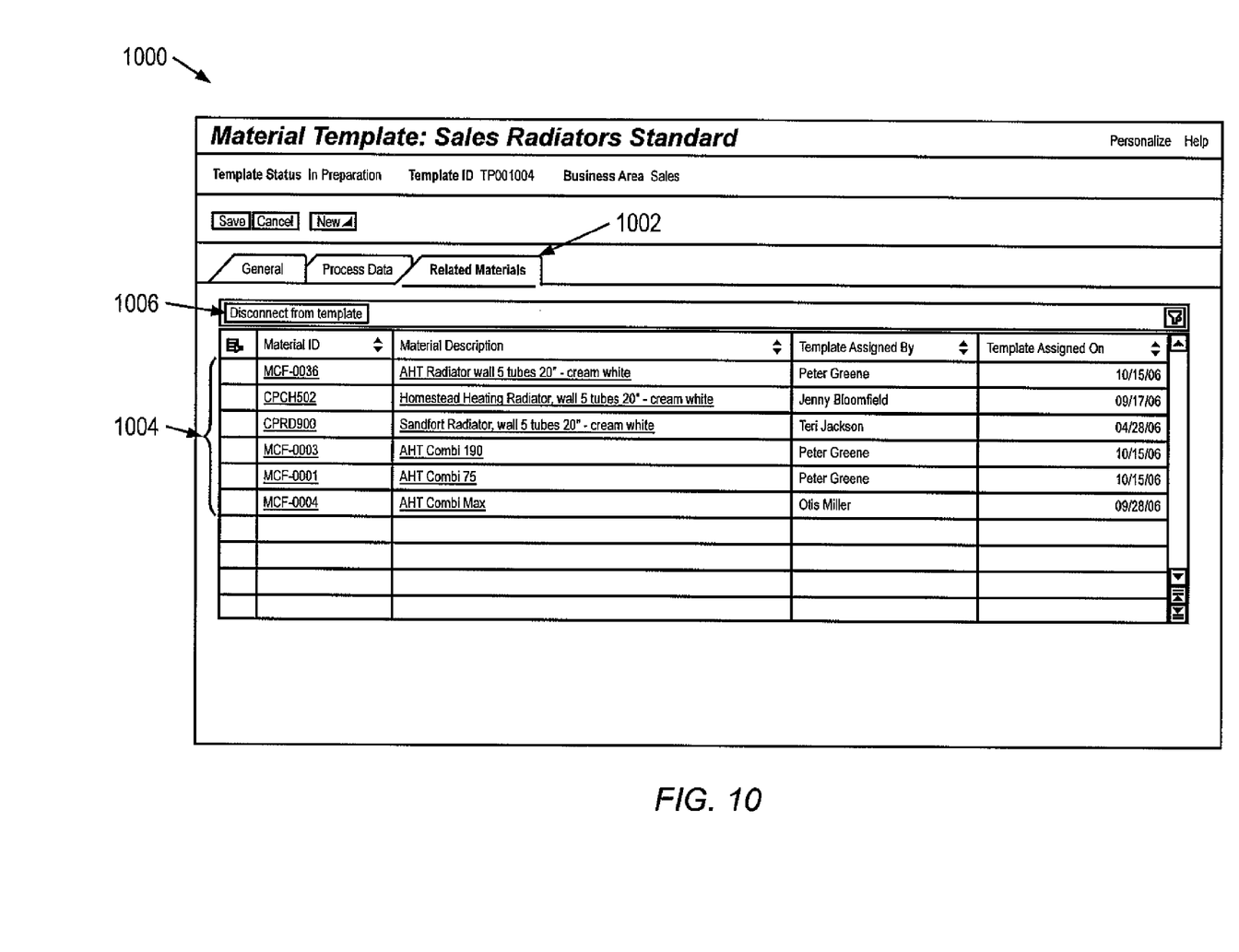
FIG. 10 is a sixth screenshot of a user interface that can be used in conjunction with the current subject matter.

FIG. 8 through FIG. 10 show user interface screenshots according to a second illustrative implementation of the current subject matter. FIG. 8 shows a screenshot 800 of the "General" tab 802 allows entry of product categories 804 and their corresponding product category identification codes 806 that are modifiable using this template. This screenshot is similar to that in FIG. 5 except the template has a different use. The template shown in FIG. 8 to FIG. 9 deals with radiator sales. This template also has fields for "Template ID" 810, "Template Description" 812, and "Template Status" 812. As shown in FIG. 8, the status is currently "In Preparation" which indicates that changes are being made to the template. unlike an "Active" template, an "In Preparation" template might be set such that it cannot be used to enter data. Data entry and changes can in some variations be locked out for records covered by this template while changes are being made.

The "Process Data" tab 902 shown in the screenshot 900 of FIG. 9 can be used to modify the template while "In Preparation" status is selected. The "Sales Organization" section 904 illustrates the range of data records over which the template can be active. Additional categories can be added or removed using the "Add Row" and "Remove" controls 906. More detailed information, such as for example auto-fill data for sales fields, warranty information, internal comments, and sales notes can be added in the "Sales Organization Details" section 910. FIG. 10 shows a screenshot 1000 of the UI with the "Related Materials" tab 1002 selected. This tab includes a listing 1004 of materials whose master data have been entered using this template. Also included are assignation data for the template for each type of material. These assignation data can include the name of the person who assigned the template and the data the template was assigned. The date assigned field can be useful in propagating updates, for example if a template update is meant to apply only to master data within a given date range, etc. As with the UI screenshot 700 shown in FIG. 7, a control 1006 is provided that allows one or more selected materials to be disconnected from the template such that future updates to the template are not propagated back to the disconnected records.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed:

1. An article comprising a non-transitory computer-readable medium embodying instructions that, when performed by one or more machines, result in operations comprising:
preparing a data entry template for entry of data in a plurality of data records distributed across a plurality of data sources, wherein the plurality of data sources include at least one of heterogeneous data sources, homogeneous data sources, and heterogeneous data sources including homogeneous sections;
wherein the preparing further includes
designating a test record from among the plurality of data records;
comparing every other one of the plurality of data records to the test record;
generating a similarity pattern based on the comparing if similarities between the test record and another compared data record in the plurality of data records exceed at least one pattern significance guideline; and
repeating the designating, the comparing, and the generating until each of the plurality of records has been designated as the test record at least once;
associating the prepared data entry template with at least one data record in the plurality of data records, wherein the associating includes
receiving a first value of a first attribute of the at least one data record in the plurality of data records in a user interface;
creating, based on the received first value, a value pattern for a second attribute for the at least one data record in the plurality of data records in the user interface;
proposing, from the created value pattern, a second value for the second attribute for the at least one data record in the plurality of data records in the user interface and using the proposed second value as a second value for the second attribute, when a frequency of occurrence of the proposed second value is greater than a threshold frequency of occurrence of the second attribute;
modifying the prepared data entry template to reflect a change to a business process that was previously represented by the data entry template;
propagating the change to the business process as reflected by the modified prepared data entry template to two or more data records associated with and previously entered using the data entry template, the propagating comprising retroactively updating the two or more data records to reflect the modified prepared entry template; and
creating a new data record using the modified prepared data entry template.

2. The article according to claim 1, wherein the data entry template is associated with each of the plurality of data records when each of the plurality of data records are created.

3. The article according to claim 2, wherein the associating comprises storing a parameter in each of the plurality of data records, the parameter indicating the identity of the data entry template.

4. The article according to claim 1, wherein the data entry template comprises a plurality of data fields that are displayed to a user in the user interface, a first of the plurality of data fields accessing the value pattern based on an entered value entered in a second of the plurality of data fields, the value pattern providing a proposed value for the first field.

5. The article according to claim 4, wherein the operations further comprise prompting a user to proceed with modifying the data entry template if the user enters a value in the second field that does not match the proposed second value for the second field.

6. The article according to claim 4, wherein the operations further comprise prompting a user to create a new template if the user enters a value in the second field that does not match the proposed second value for the second field.

7. The article according to claim 1, wherein the modifying comprises providing the user interface via which a user alters a value of a data entry field in the data entry template.

8. The article according to claim 1, wherein the modifying comprises:
recognizing that a user has accessed at least one record in the plurality of data records and made a change to at least one value in the at least one record; and
prompting the user to update the data entry template to reflect the change to the at least one value.

9. The article according to claim 1, wherein the dynamically creating the value pattern for the second attribute comprises:
accessing the value pattern for the second attribute of the at least one data record in the plurality of data records based on the first value, the data entry template comprising the value pattern for the second attribute.

10. The article according to claim 1, wherein the associating of the data entry template with each of the plurality of records comprises storing a parameter in each of the plurality of data records, the parameter indicating the identity of the data entry template.

11. The article according to claim 1, wherein the propagating occurs without downloading the plurality of data records from the data sources.

12. The article according to claim 1, wherein the operations further comprise
propagating the change to the business process to all of the plurality of data records associated with the data entry template.

13. The article according to claim 1, wherein the plurality of data records each comprise a plurality of data values.

14. The article according to claim 13, wherein the plurality of data records are stored in one or more non-transitory storage media.

15. The article according to claim 1, wherein the plurality of data values correspond to one or more of business materials data, business services data, supply chain management data, customer relationship data, part number data, human resource data, project management data, project lifecycle data, and enterprise analytics data.

16. A computer-implemented method comprising:
preparing a data entry template for entry of data in a plurality of data records distributed across a plurality of data sources, wherein the plurality of data sources include at least one of heterogeneous data sources, homogeneous data sources, and heterogeneous data sources including homogeneous sections;
wherein the preparing further includes
designating a test record from among the plurality of data records;
comparing every other one of the plurality of data records to the test record;
generating a similarity pattern based on the comparing if similarities between the test record and another compared data record in the plurality of data records exceed at least one pattern significance guideline; and
repeating the designating, the comparing, and the generating until each of the plurality of records has been designated as the test record at least once;
associating the prepared data entry template with at least one data record in the plurality of data records, wherein the associating includes
receiving a first value of a first attribute of the at least one data record in the plurality of data records in a user interface;
creating, based on the received first value, a value pattern for a second attribute for the at least one data record in the plurality of data records in the user interface;
proposing, from the created value pattern, a second value for the second attribute for the at least one data record in the plurality of data records in the user interface and using the proposed second value as a second value for the second attribute, when a frequency of occurrence of the proposed second value is greater than a threshold frequency of occurrence of the second attribute;
modifying the prepared data entry template to reflect a change to a business process that was previously represented by the data entry template;
propagating the change to the business process as reflected by the modified prepared data entry template to two or more data records associated with and previously entered using the data entry template, the propagating comprising retroactively updating the two or more data records to reflect the modified prepared entry template; and
creating a new data record using the modified prepared data entry template,
wherein the at least one of the preparing, the associating, the modifying, the propagating, and the creating is performed on at least one processor.

17. The computer implemented method according to claim 16, further comprising:
associating the first data entry template with each of the plurality of data records upon creation of each of the plurality of data records.

18. The computer implemented method according to claim 16, wherein the associating comprises storing a parameter in each of the plurality of data records, the parameter indicating the identity of the first data entry template.

19. The computer implemented method according to claim 16, wherein the first data entry template comprises the plurality of data fields that are displayed to a user in the user interface, a first of the plurality of data fields accessing the value pattern based on an entered value entered in a second of the plurality of data fields, the value pattern providing a proposed value for the first field.

20. The computer implemented method according to claim 16, wherein the modifying comprises providing the user interface via which a user can alter a value of a data entry field in the first data entry template.

21. The computer implemented method according to claim 16, wherein the modifying comprises:
recognizing that a user has accessed at least one record of the plurality of data records and made a change to at least one value in the at least one record; and prompting the user to update the first data entry template to reflect the change to the at least one value.

22. A system comprising: at least one memory that stores instructions in a machine readable language; and
at least one processor that accesses the at least one memory and executes the instructions to perform operations comprising:
preparing a data entry template for entry of data in a plurality of data records distributed across a plurality of data sources, wherein the plurality of data sources include at least one of heterogeneous data sources, homogeneous data sources, and heterogeneous data sources including homogeneous sections, and wherein the plurality of data records each comprise a plurality of data values;
wherein the preparing further includes
designating a test record from among the plurality of data records;
comparing every other one of the plurality of data records to the test record;
generating a similarity pattern based on the comparing if similarities between the test record and another compared data record in the plurality of data records exceed at least one pattern significance guideline; and
repeating the designating, the comparing, and the generating until each of the plurality of records has been designated as the test record at least once;
associating the prepared data entry template with at least one data record in the plurality of data records, wherein the associating includes
receiving a first value of a first attribute of the at least one data record in the plurality of data records in a user interface;
creating, based on the received first value, a value pattern for a second attribute for the at least one data record in the plurality of data records in the user interface;
proposing, from the created value pattern, a second value for the second attribute for the at least one data record in the plurality of data records in the user interface and using the proposed second value as a second value for the second attribute, when a frequency of occurrence of the proposed second value is greater than a threshold frequency of occurrence of the second attribute;
modifying the prepared data entry template to reflect a change to a business process that was previously represented by the data entry template;
propagating the change to the business process as reflected by the modified prepared data entry template to two or more data records associated with and previously entered using the data entry template, the propagating comprising retroactively updating the two or more data records to reflect the modified prepared entry template; and
creating a new data record using the modified prepared data entry template.

* * * * *